United States Patent [19]
Gotchall

[11] Patent Number: 5,372,541
[45] Date of Patent: Dec. 13, 1994

[54] LIVE FISH MARKING AND HANDLING SYSTEM

[76] Inventor: Walter F. Gotchall, 5065 S. E. Britten, Milwaukie, Oreg. 97267

[21] Appl. No.: 62,561

[22] Filed: May 17, 1993

[51] Int. Cl.$^5$ .................. A22C 25/00; A22C 17/10
[52] U.S. Cl. .................. 452/166; 452/154; 452/170
[58] Field of Search ............ 452/166, 170, 154, 156, 452/157, 158, 159

[56] References Cited

U.S. PATENT DOCUMENTS

| | | | |
|---|---|---|---|
| Re. 33,917 | 5/1992 | Lapenre et al. | 452/157 |
| 4,463,478 | 8/1984 | Hartmann et al. | 452/154 |
| 4,649,603 | 3/1987 | Bartels | 452/157 |
| 4,761,856 | 8/1988 | Ewing | 452/154 |
| 4,979,268 | 12/1990 | Kure | 452/108 |

*Primary Examiner*—Willis Little
*Attorney, Agent, or Firm*—Robert L. Harrington

[57] ABSTRACT

An automated fish marking system includes a conveyor system moving a set of fish trays through a marking or cutting station. In the illustrated embodiment, the trays are filled manually by several workers and subsequent marking steps are automated. Thus, fish handling is limited to filling of the trays and once the fish are placed in the trays they suffer no further handling. The trays retain the fish in a given position and orientation for movement past a water jet cutting system. The cutting system marks each fish by severing a particular fin as it passes through the marking station. After marking, the fish may be automatically returned to a holding tank.

19 Claims, 7 Drawing Sheets

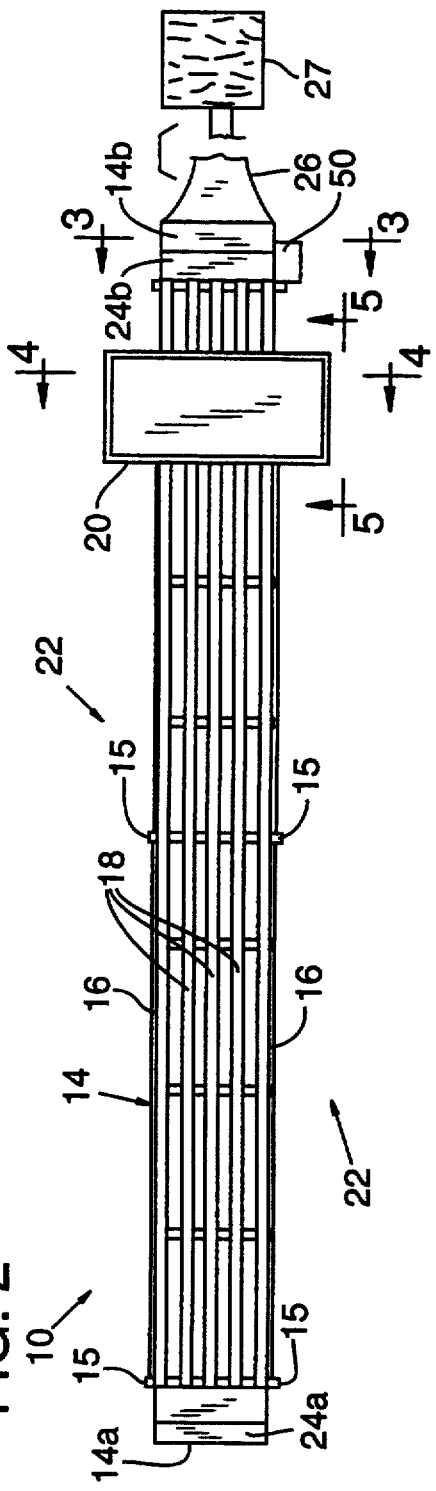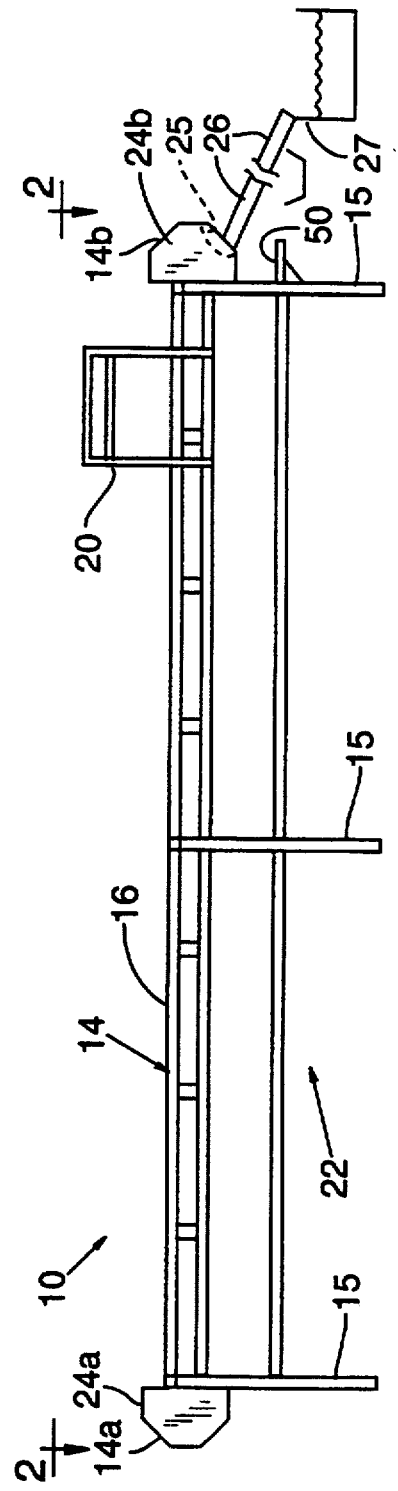

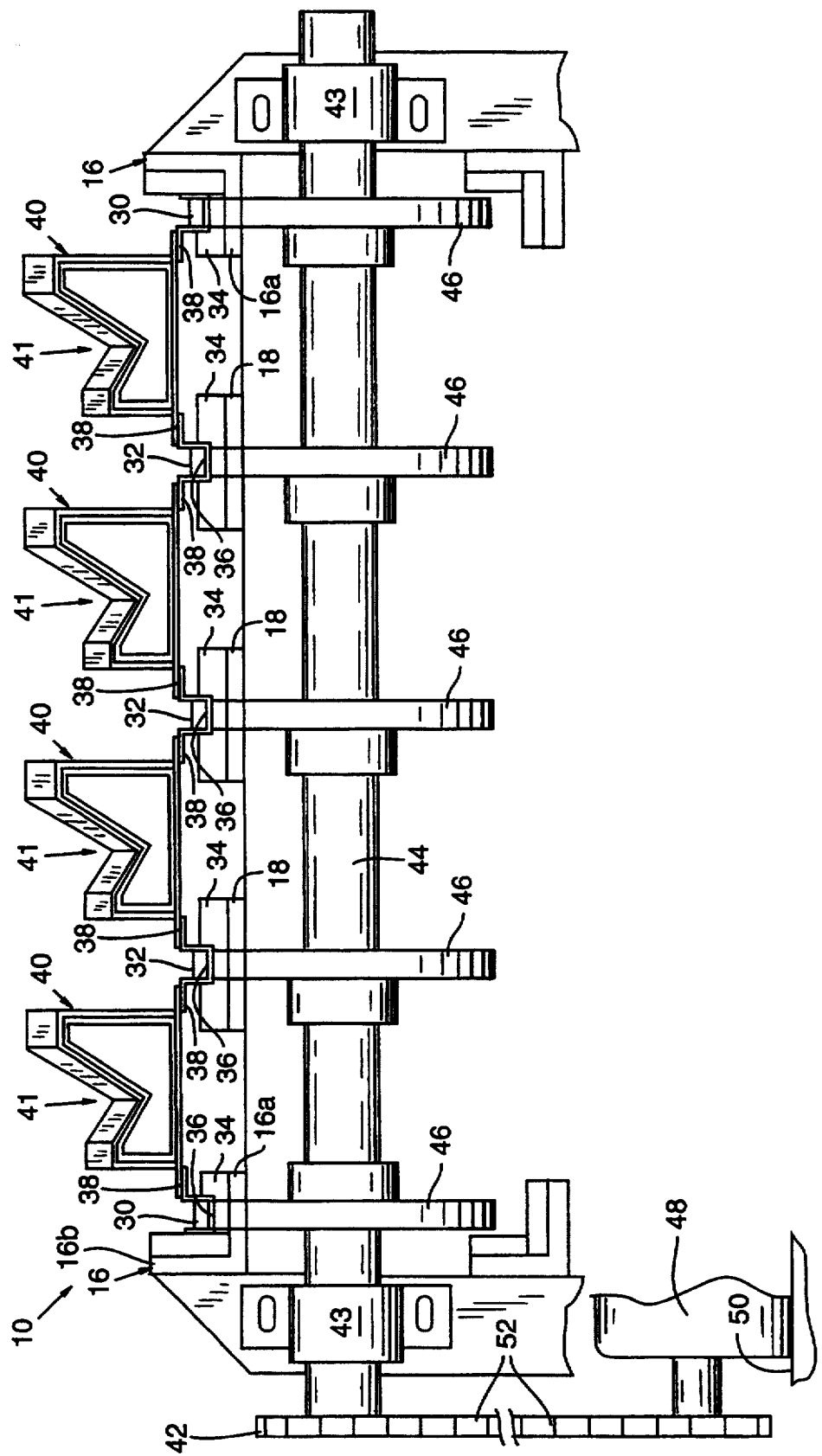

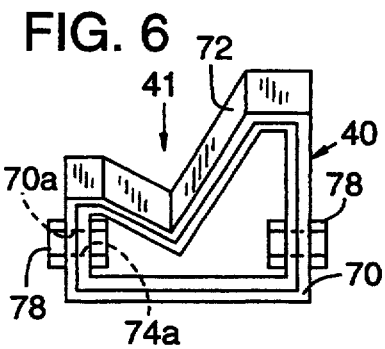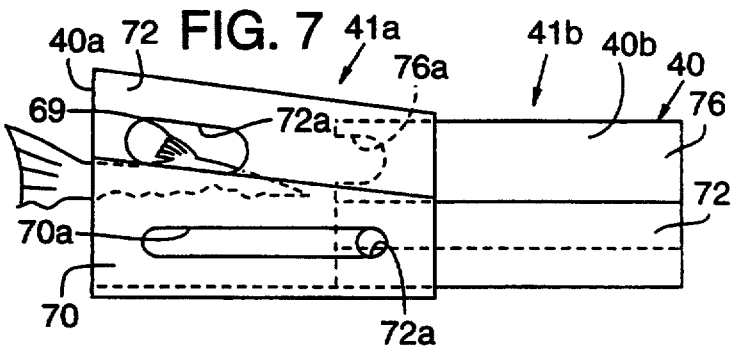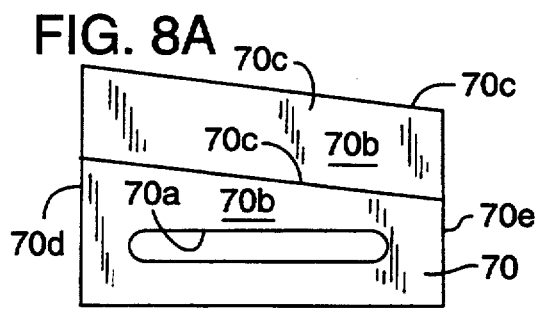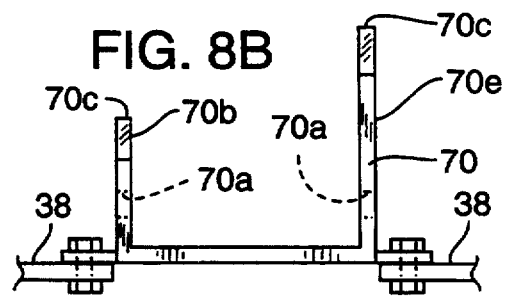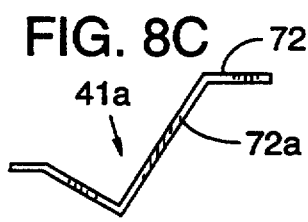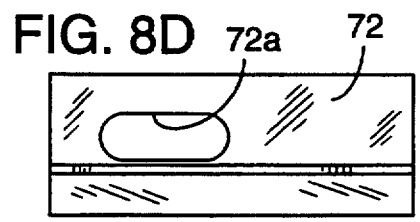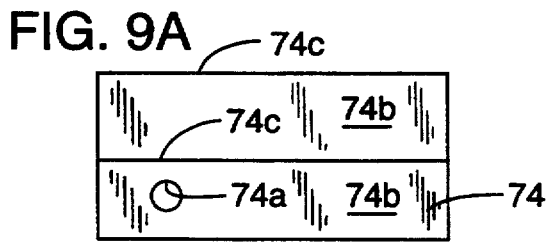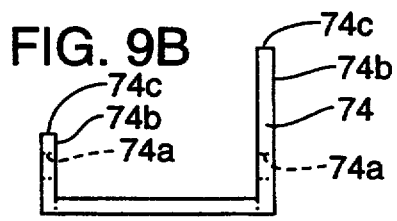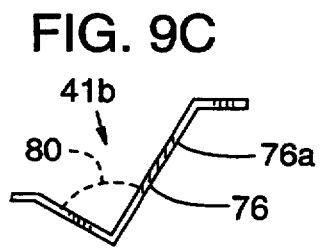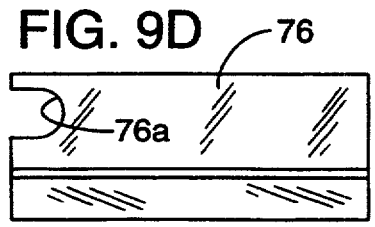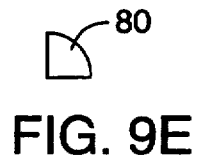

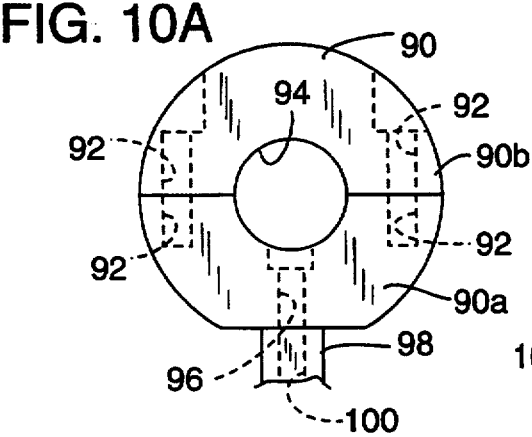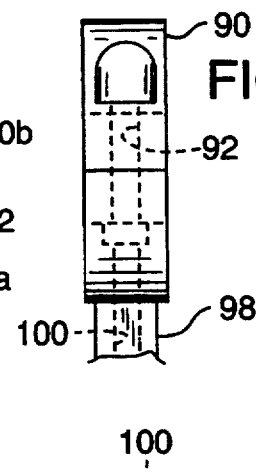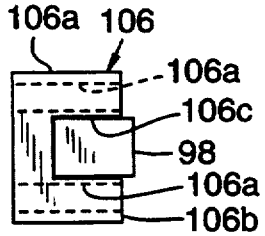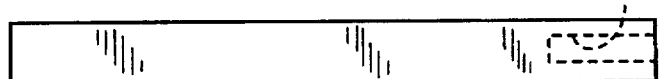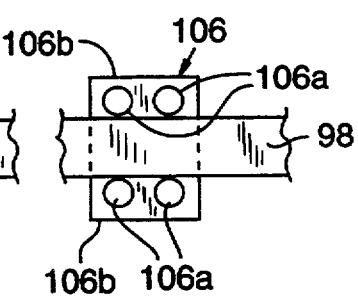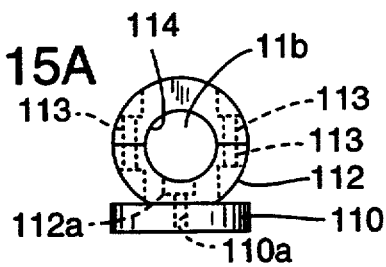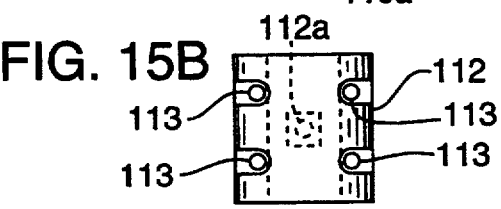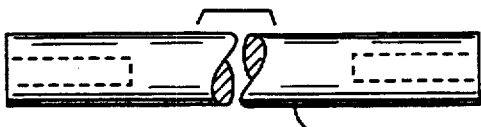

LIVE FISH MARKING AND HANDLING SYSTEM

BACKGROUND OF THE INVENTION

The present invention relates generally to apparatus for handling of live fish, and particularly to handling of live fish in an automated marking operation such as severing fish fins.

The practice of marking hatchery fish supports efforts directed to protection of wild fish species. Marking hatchery fish provides a basis for distinguishing between wild fish and hatchery fish. Typically, marking is accomplished by severing a particular fin of the hatchery raised fish. Fisherman catching a fish without marking, i.e., with all fins intact, conclude the fish is a wild fish and return the fish to its natural habitat. The marked hatchery fish, however, are available for capture and use without restriction. Heretofore, only specific species of hatchery fish have been marked.

Mass marking across more species and for larger numbers of fish, however, is a growing trend in the fish management. Mass marking of hatchery fish has been proposed as a solution to a variety of difficulties encountered in the management of fish populations. There is growing political support for a mass marking program for hatchery fish in, for example, the Upper Columbia River Basin to more easily differentiate hatchery fish from wild fish. Thus, marking of all hatchery fish is important for protection of our declining wild fish populations. This is an evermore urgent goal and has been recognized as an important step in the preservation of wild fish species.

Prior marking techniques have been generally manual intensive techniques. In particular, each fish is individually handled and a selected fin severed with, for example, scissors. While the process has worked in the past, it will not work well for larger volumes of fish. Heretofore, fish management agencies have relied on volunteers to mark hatchery fish. Unfortunately, such volunteers can be hard to enlist and often are not always available long enough to complete a given batch of hatchery fish. Government agencies are then left with the difficult task of completing the marking procedures with insufficient staff after their volunteers have gone home.

Furthermore, the manual marking of fish tends to be not only slow and limited in productivity, but also provides opportunity for injury and infection to the fish. In particular, the extensive handling and prolonged time under anesthesia reflect badly on fish health, and in many cases result in fish death. Handling of fish increases the possibility of infection due to the loss of the fish's protective coating during manual handling. Mortality rates estimated as high as 40% result from traditional fish marking methods.

It would be desirable, therefore, to mark massive fish populations prior to their release into natural habitats without excess cost and with reduced risk of injury or death to the fish. Because fish populations are managed by government agencies, cost and efficiency are important to maximize government expenditures in implementation of wildlife protection policies.

SUMMARY OF THE INVENTION

A preferred embodiment of the present invention in a first aspect is a fish handling system receiving anesthetized fish in individual fish holding trays moving through an automated cutting station. The fish holding trays maintain the fish in a given position relative to a cutting mechanism of the marking station and as the fish passes by the cutting mechanism, the cutting mechanism severs a particular fin as a marking indicia. It is contemplated that the apparatus take generally the form of a conveyor system moving a plurality of fish holding trays through the marking station which reacts to the passage of fish by activation of the cutting mechanism to sever a selected fin. According to another aspect of the present invention, the cutting mechanism takes the form of a water jet stream considered more compatible with the aquatic habitat of fish and less traumatic than other cutting mechanisms such as manual cutting by hand held scissors.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which:

FIGS. 1 and 2 illustrate side and top views of a conveyor frame of the present invention.

FIG. 3 illustrates an end view of the conveyor frame of FIGS. 1 and 2, showing also conveyor chains and fish holding trays carried by the chains.

FIGS. 6 and 7 illustrate end and side views of a fish holding tray in accordance with the present invention and conveyed upon the conveyor system of FIGS. 1-3.

FIGS. 8A-8D and 9A-9E illustrate various views of the components of the fish holding tray of FIGS. 6 and 7.

FIGS. 10-16 illustrate individual components of a cutting head mounting arrangement.

FIG. 17 illustrates one of two mounting rods holding a plurality of cutting head mounting arrangements as illustrated in FIGS. 10-16.

DETAILED DESCRIPTION OF THE PREFERRED EMBODIMENT

Figure 4:
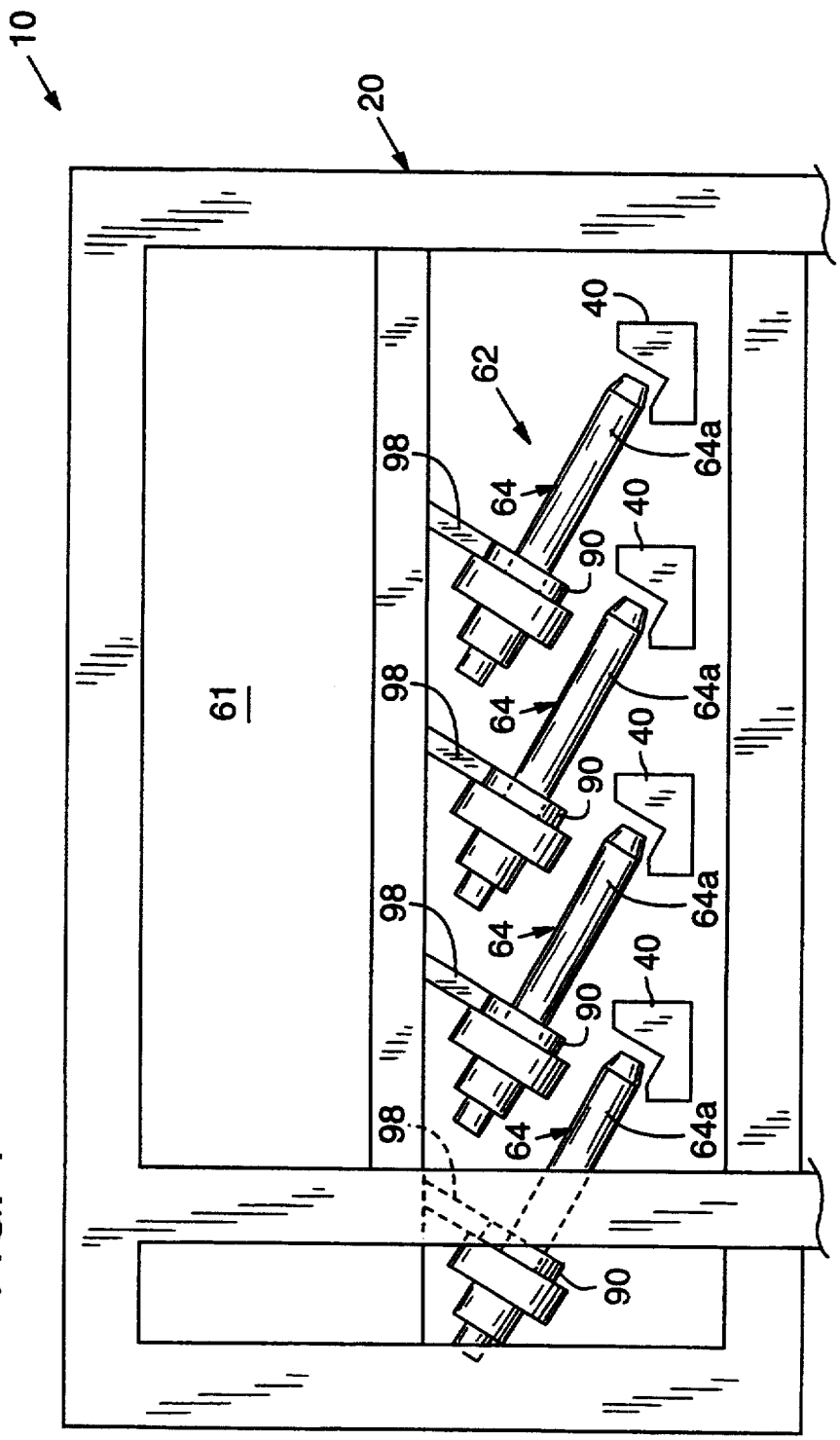
FIGS. 4 and 5 illustrate end and side views, respectively, of a fish marking station for severing a particular fin of a fish traveling therethrough upon the conveyor system of FIGS. 1-3.

The preferred embodiment of the present invention as illustrated in the drawings comprises generally a conveyor and cutting system 10 receiving in individual holding trays live anesthetized fish to be marked, moving the fish through a marking station automatically severing a particular fin to indicate marking, and discharging the fish for return to a holding tank.

System 10 is an improvement over prior manual intensive marking methods relying on extensive physical handling of each fish prior to and during a manual fin cutting step wherein a person holds the fish in one hand and, with the other hand, cuts a fin with scissors. Because the fish are handled less and are more efficiently processed under the present invention, however, the fish experience less trauma and risk of injury or death while production is greatly increased with a resulting overall reduced per fish cost of marking.

FIGS. 1 and 2 illustrate side and top views, respectively, of a conveyor frame 14 used in implementation of system 10. The frame 14 is constructed of stainless steel to better withstand the aquatic conditions of intended use. Frame 14 includes generally a set of vertical support legs 15, two longitudinal side rails 16 and three longitudinal middle rails 18. As discussed more fully below, rails 16 and 18 support a set of endless conveyor chains carrying fish holding trays (not shown in FIGS. 1 and 2) for movement from an input end 14a of frame 14 to a discharge end 14b of frame 14. Intermediate of the input end 14a and a marking station 20, where selected fins are automatically severed, a tray loading area 22 is accessible from each side of frame 14. It is contemplated, in the illustrated embodiment, that six workers, three on each side of frame 14, place anesthetized fish into holding trays of system 10 for marking. Each person loading the trays works alongside the conveyor system 10 and each has a bin of anesthetized fish to be placed in the trays as the trays move along system 10 toward marking station 20.

At the input end 14a and discharge end 14b, chain covers 24a and 24b, respectively, guard the moving trays as they come from below frame 14 at end 14a and as they go below frame 14 at discharge end 14b. Chain cover 24b includes an opening 25 through which fish fall from the holding trays onto a discharge slide 26 for automatic delivery to a holding tank 27.

In the preferred embodiment, frame 14 is approximately sixteen feet long and approximately forty inches high. Frame 14 can take, however, a variety of specific forms and dimensions, the basic function being support for and conveyance of the fish holding trays through tray loading area 22 and then through the marking station 20. Generally, the conveyor chains lie above rails 16 and 18 and the fish holding trays span adjoining chains.

FIG. 3 shows an end view of rails 16 and 18 and also an end view of conveyor chains 30 and 32 resting thereabove. The side rails 16 are inward facing angle iron stock, with each side rail 16 including one horizontal leg 16a providing an upward facing chain support surface and one vertical leg 16b providing an inward facing surface. Each of the middle rails 18 is horizontal flat stock providing an upward facing chain support surface. Thus, each of the rails 16 and 18 support a corresponding one of the conveyor chains 30 and 32, respectively. A UHMW (ultra high molecular weight) slide plate 34 lies intermediate of each chain 30 and 32 and the underlying support surface, i.e., one of rails 16 and 18. Each slide plate 34 provides a longitudinal, upward facing channel 36 along the length of system 10 providing both vertical support and lateral stability for the chains 30 and 32 traveling therealong.

The interior chains 32 include at each link thereof laterally outward extending ears 38 and the side chains 30 include at each link an ear 38 extending laterally inward toward the adjacent chain 32. FIG. 3 illustrates the use of laterally adjacent ears 38 to mount a tray 40 thereon. In particular, each tray 40 is bolted (not shown) directly onto the upward facing surface of two ears 38 to span adjacent ones of chains 30 and 32 as indicated in FIG. 3. It is suggested that the attachment of trays 40 to ear 38 allow longitudinal adjustment of trays 40 so as to permit adjustment if necessary in the relative longitudinal positioning of trays 40. As will be more apparent hereafter, precise positioning of trays 40 supports improved precision in the fin cutting procedures employed under the present invention.

Chains 30 and 32 are driven in unison to maintain coordinated movement of trays 40 along system 10. The movement of the chains in closely coordinated fashion establishes precision with respect to tray 40 movement and positioning relative to the fin cutting devices of marking station 20. Fish holding trays 40, described and illustrated more fully hereafter, provide a longitudinally inclined V-shaped trough 41 for receiving individual fish and maintaining each fish in a given position and orientation relative to the corresponding tray 40.

FIG. 3 also shows a drive assembly 42 including a common drive shaft 44 supported upon bearings 43 and carrying a sprocket 46 for each of chains 30 and 32. A motor 48 rests below shaft 44 upon shelf 50 (FIGS. 1 and 2) and couples to shaft 44 through drive chain 52 for coordinated movement of all chains 30 and 32 simultaneously according to motor 48 operation. Both lateral and longitudinal relative positioning of trays 40 is important. Trays 40 should be maintained within given positional tolerances to accomplish precise fin cutting. In particular, some of the fins to be cut can regenerate if not cut closely and therefore require a certain degree of precision to avoid incomplete cuts and, as a result, potential regeneration of the fin.

It is contemplated that the system 10 move continuously with the cutting mechanism of station 20 reacting to continuous movement of the chains 30 and 32, however, automated stop and start control over chain movement could be used depending on the complexity of the cutting operation and control scheme used. In particular, the cutting operation could include intermittent stopping of the chains, e.g., by precise control over motor 48, to accommodate an alternate control scheme.

Figure 5:
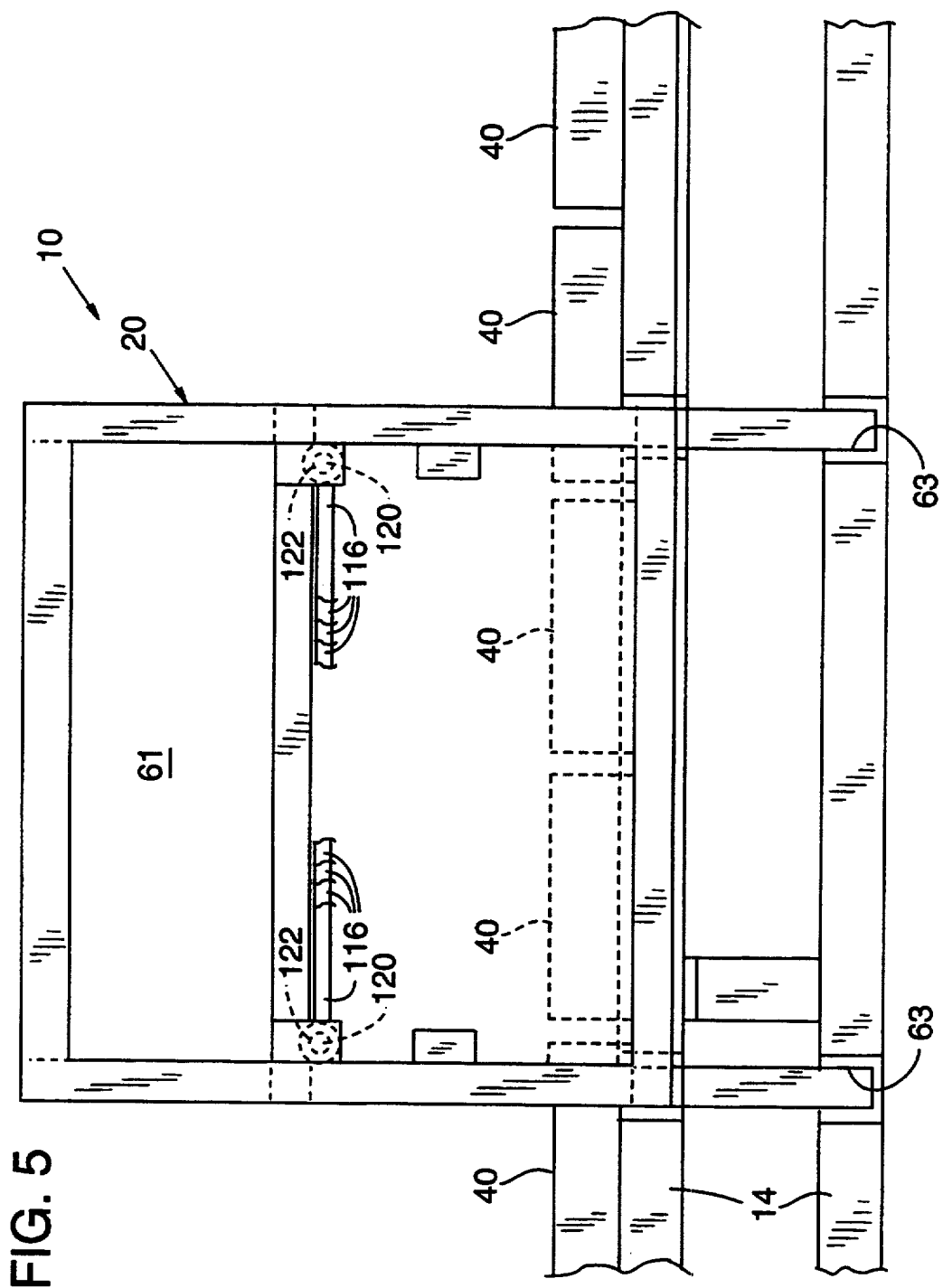

FIGS. 4 and 5 show more detailed end and side views, respectively, of marking station 20. The trays 40 pass through marking station 20 which includes an electrical power and control portion 61 and a water jet cutting system 62 (not shown in FIG. 5). Marking station 20 can be separately manufactured from the conveyor system 10 to allow station 20 to be selectively mounted and dismounted from the conveyor system to facilitate separate repair, upgrading or adjustment to the cutting mechanism. Thus, the cutting station 60 could be dropped from overhead to sit upon the frame 14 in such position to allow trays 40 to pass therethrough. Mounting sites 63 (FIG. 5) should provide precise mounting of the marking station 20 relative to the frame 14 and the trays 40 moving therepast.

FIG. 4 shows a set of four cutting heads 64 and their positioning relative to four trays 40. Each cutting head 64 has a variety of positioning capabilities to allow versatility in cutting head 64 use. Each cutting head 64 is oriented generally transverse to the path of a corresponding column of trays 40, i.e., transverse relative to a series of longitudinally aligned trays 40. Thus, as each tray 40 passes with a fish to be marked resting therein, the associated cutting head 64 is activated to sever a selected fin.

FIGS. 6–9 show more detail for the fish holding trays 40. Each tray 40 comprises two sub-components, 40a and 40b in FIG. 7, slidably interconnected for relative longitudinal movement. The trays 40 are open ended with a central cavity to allow passage of water from the cutting jet stream out of each tray 40. Each sub-component includes a lower foundation component and a fish support trough. Thus, for sub-component 40a, an outer foundation 70 (FIGS. 8A and 8B) attaches to the ears 38 of adjacent ones of chains 30 and 32 as indicated in FIG. 8B. Foundation 70 comprises generally an upward facing channel with a slot 70a running longitudinally along each side wall 70b. The upper edge 70c of each side wall 70b is inclined longitudinally downward from the rear end 70d to the forward end 70e. Also, one side wall 70b is of greater height than the other side wall 70b. A support trough 72 (FIGS. 8C and 8D) lies upon the upper edges 70c and defines generally the rear portion 41a of trough 41, the trough 41 thereby inclining downward longitudinally along its base and having laterally inclined wall formations in V-shaped relation.

For sub-component 40b, an inner foundation 74 (FIGS. 9A and 9B) rests slidably within foundation 70 and carries a support trough 76 (FIGS. 9C and 9D), the trough 76 defining the forward portion 41b of trough 41 with inclined walls in V-shaped relation. Foundation 74 is an upward facing channel member similar to foundation 70, but of lesser dimension to accommodate sliding within foundation 70, and has an aperture 74 in each side wall 74b with horizontally oriented top edges 74c for each side wall 74b. The support trough 76 is similar in shape to the support trough 72, but of lesser dimension for sliding, overlapping relation relative to the support trough 72. As shown in FIG. 7, the rear portion 41a of trough 41 is downwardly inclined along a longitudinal axis as defined by the support trough 72, and the forward portion 41b is horizontally oriented along a longitudinal axis as defined by the support trough 76.

Foundation 70 is stationary with respect to the chains 30 and 32 and foundation 74 slides within foundation 70. In particular, the longitudinal slots 70a and corresponding bolt apertures 74a establish a sliding relation between foundations 70 and 74. A bolt 78 passes through each aperture 74a and corresponding slot 72a to establish a longitudinal sliding relationship between foundations 70 and 74, and between the corresponding support troughs 72 and 76. Once a given relative position between sub-components 40a and 40b is established, the bolts 78 may be tightened to maintain such relative position. It is contemplated that the various components of each tray 40 be stainless steel material and welded together to better withstand the aquatic conditions under which they are used, and to better withstand any inadvertent cutting by the water jet cutting heads 64.

Support trough 72 includes a cutout 72a, generally an elongate slot formation, positioned relative to a selected fish fin to be cut. Cutout 72a allows continued movement of the water jet stream following fin cutting, i.e., through the support trough 72 and into the inner cavity of tray 40. Without the cutout 72a, the water jet stream would strike the tray assembly and potentially cause disruption of fish position. The other support trough 76 includes a cutout 76a. The cutout 76a is coordinated in position and size with the cutout 72a to allow more complete collapsing or shortening of the tray assembly, e.g., down to 3½ inches, while permitting the above-described flow of the water jet stream. The cutouts 76a and 72a shown in the drawings and discussed herein are for cutting of the adipose fin 69 of a fish (shown partially in FIG. 7) to be marked. If other fins are to be cut, other cutouts would be employed in coordination with the position of such fins on the fish body and the placement of the fish body in the tray 40.

FIG. 9E illustrates an end cap 80, a quarter circle piece, attached at the forward end of trough 76 to retain the fish in its position on the tray 40. In particular, the fish tend to be slippery with respect to the tray 40, especially if there is any water movement under the fish, and the end cap 80 aids in maintaining the fish in its position upon the tray assembly. In particular, it is contemplated that the fish rest with its nose against the end cap 80 and thereby achieve a stable position and orientation upon the tray 40.

The illustrated trays 40 are, by appropriate adjustment, able to handle fish sizes in the range of 3½ inches up to 6 inches. However, as may be appreciated, larger fish sizes could be accommodated by appropriate dimensioning of the trays 40. The fish population in the age and size group of 3½ inches to 6 inches, however, can be efficiently selected by length to provide to the fish marking system 10 batches of fish substantially of identical size. It is contemplated that for a given batch of fish to be marked the trays 40 be adjusted to an appropriate length to accommodate the batch length. The tray assemblies can be marked with a scale (not shown) for consistent length adjustment among all trays 40. The cutting operation would be coordinated with tray 40 movement to activate the cutting mechanism at the beginning of the leading edge of the cutout 72a and terminate cutting as the trailing end of the cutout 72a passes by. Thus, the cutout 72a is preferably stationary relative to the chains 30 and 32, i.e., in support trough 72 to provide synchronization for cutout 72a relative to chain 30 and 32 movement and cutting head 64 operation.

Figure 18:
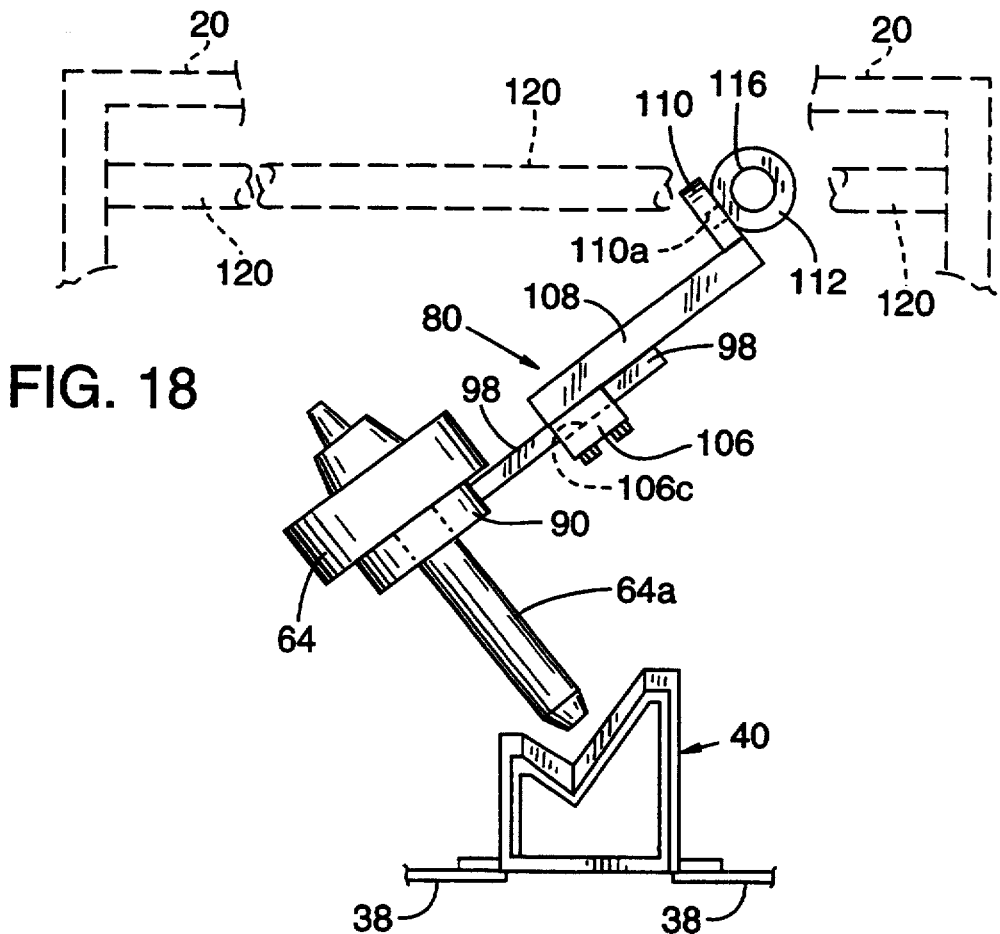
FIG. 18 illustrates an assembled cutting head mounting arrangement.

FIGS. 10-18 illustrate a cutting head 64 mounting arrangement 80 providing versatile and precise positioning of the cutting heads 64. A separate mounting arrangement 80 is provided for each cutting head 64. FIGS. 10-16 illustrate separate components of the mounting arrangement. FIG. 17 illustrates one of two transverse rods mounted to the cutting station 20 (both shown in FIG. 5) and holding the collection of mounting arrangements 80 for the cutting heads 64. FIG. 18 illustrates one assembled mounting arrangement 80 holding a cutting head 64 in relation to a fish holding tray 40 and its mounting relative to the cutting station 20.

FIGS. 10a and 10b show front and side views, respectively of a cutting head clamp 90. Clamp 90 is a bifurcated collar including separate components 90a and 90b held together by way of bolts (not shown) secured within apertures 92. A central cylindric opening 94 receives the discharge tube 64a of the cutting head 64. A third bolt aperture 96 of clamp 90 permits mounting of clamp 90 upon an arm 98 shown in FIG. 11. Arm 98 is a length of square cross section solid stock having at its distal end a bolt aperture 100 at which clamp 90 mounts by a bolt (not shown) extending from aperture 96 of claim 90. Thus, clamp 90 holds the cutting head 64 at the distal end of arm 98. The longitudinal axis of each tube 64a thereby remains orthogonal relative to arm 98, but may be rotated about the longitudinal axis of arm 98.

Arm 98 is captured between and may be adjusted longitudinally relative to a clamp 104 formed by elements 106 (FIGS. 12A and 12B) and 108 (FIG. 13). Element 106 is a channel formation including four bolt apertures 106a passing through the side walls 106b thereof. Arm 98 rests within the channel 106c and is captured therein by the element 108. More particularly, element 108 includes bolt apertures 108a corresponding in position to the bolt apertures 106a of element 106. A plate 110 (FIG. 14) is welded onto the end 108a of element 108 and carries at its center an aperture 110a. Plate 110 then mounts to a clamp 112 (FIGS. 15A and 15B). Clamp 112 is a bifurcated color, similar to clamp 90, with bolt apertures 113 for bolting the clamps together and with a central cylindric aperture 114. A bolt aperture 112a permits mounting of clamp 112 to the plate 110 at its aperture 110a. Clamp 112 receives within its central aperture 114 a shaft 116, and is thereby attached at a specific point along shaft 116 by tightening of bolts within the apertures 113 of clamp 112. This allows clamp 112 to be selectively positioned along the length of shaft 116 as well as radially with respect to the axis of shaft 116. Shaft 116 lies parallel to the path of the trays 40.

A pair of transverse support rods 120 (one shown in FIG. 17, both shown in FIGS. 5 and 18) mount to cutting station 20 and support, e.g., by clamps 122 (FIG. 5) each end of the shafts 116 to allow lateral positioning of the shafts 116. While the shafts 116 are movable serially adjacent one another along the transverse support rods 120, it is possible to achieve in-line positioning of at least two of the cutting heads 64 by virtue of the versatile multi-dimensional positioning capability of the cutting head mounting arrangements.

Thus, each cutting head 64 is supported by a versatile support and positioning mechanism providing a variety of cutting head 64 positions and orientations with precision relative to the trays 40 moving therepast. As may be appreciated, however, a variety of mounting and positioning arrangements may be provided for the cutting heads 64 to achieve versatile and precise positioning of the cutting heads 64 relative to the fish holding trays 40 moving therepast.

The cutting heads 64 are each individually controllable by electronic control circuitry and coordinated in their operation relative to passage of each cutout 72a thereby. The water cutting mechanism contemplated for use under the present invention is available from the company Jet Edge, 825 Rhode Island Ave., South, Minneapolis, Minn., 55426. A variety of control mechanisms may be used to implement this coordinated activation of the cutting heads. Generally, it is desirable to activate the cutting head as the leading edge of the cutout 72a passes the cutting head and terminate operation of the cutting head as the trailing edge of the cutout 72a passes by. Such timing could be achieved by a cycle timer or by a photo optic device detecting passage of the cutout thereby.

Figure 19:
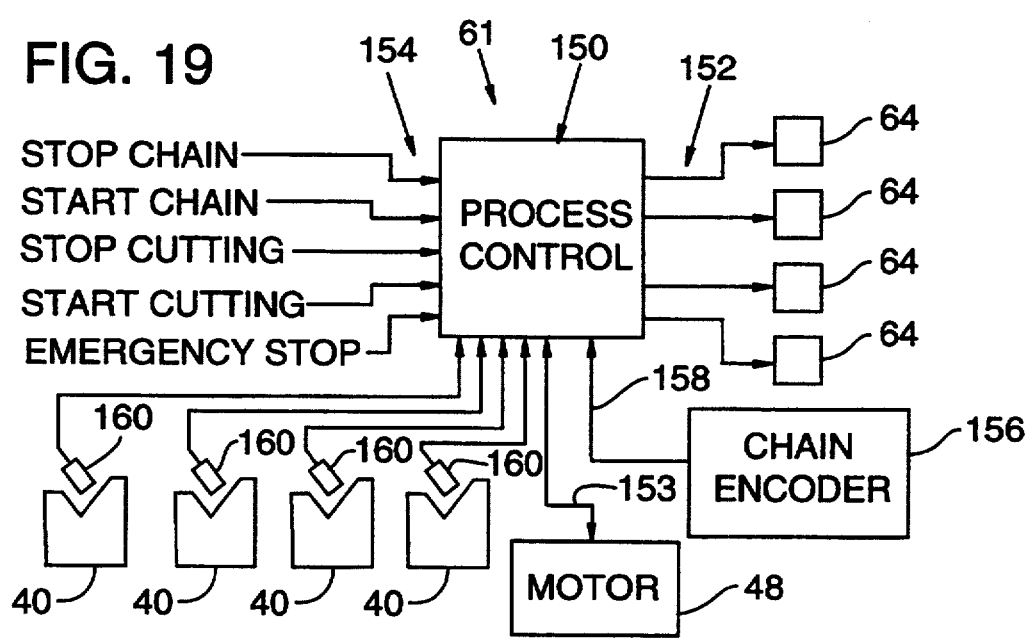
FIG. 19 illustrates a control scheme for operation of the fish marking system of the present invention.

FIG. 19 illustrates a control scheme for control portion 61 contemplated under the present invention. In FIG. 19, a process control block 150, e.g., a programmable controller, receives various inputs and provides various outputs for operation of the system 10. In particular, process control 150 drives by way of output 152 the cutting heads 64. Output 153 controls operation of chain drive motor 48. Thus, process control 150 can selectively and individually actuate each cutting head 64 according to programmed control in relation to tray 40 movement. Each cutting head 64 is operated in a start/stop fashion to accomplish brief intervals of cutting operation relative to tray 40 movement. Manual inputs 154 originate from workers operating system 10. For example, input 154 may include stop chain, start chain, stop cutting, start cutting, and emergency stop to provide manual control features over system 10. Such control features, especially emergency control features, could be implemented by way of switch devices in the fish loading areas 22 and also at the cutting station 20.

The timing of cutting head 64 operation relative to the passage thereby of a fin to be severed may be accomplished by a variety of alternative mechanisms, two of which are shown in FIG. 19. First, a chain encoder 156 provides an input signal 158 to process control 150 representative of chains 30 and 32 position. From the signal 158, and given sufficient precision mounting and movement of trays 40, process control 150 may infer the position of the fish holding trays 40 relative to cutting heads 64. Accordingly, process control 150 may appropriately activate cutting heads 64 in coordination with the passage thereby of a cutout 72a and thereby accomplish marking of a fish fin. Alternatively, photo transducers 160, one for each cutting head 64, may be employed to detect the passage thereby of a cutout 72a. More particularly, each photo transducer 150 directs a light beam toward the reflective stainless steel surface of each fish holding tray 40 passing thereby. Each transducer 160 would further include a light detector responsive to the reflected light coming from the stainless steel surface of the fish holding tray 40. As the cutout 72a passes, the transducer 160 would not see the reflected light, the falling edge of the reflected light indicating the leading edge of the cutout 72a. The trailing edge of the cutout 72a corresponds to the rising edge of reflected light signal. By providing the reflected light signal from each transducer 160 to the process control 150, process control 150 could infer the presence of the leading edge and trailing edge of each cutout 72a passing by the corresponding cutting head 64. As may be appreciated, the programming of process control 150 should account for the lack of a reflected light signal during times when no fish holding tray 40 is in front of the transducer 160. For example, process control 160 could be programmed to first detect the presence of the reflected light signal for a given time corresponding to the passage of the fish holding tray 40 thereby as a precondition to a conclusion that the leading edge of cutout 72a was passing by. Alternatively, a given pattern of reflective and non-reflective surfaces of the fish holding tray 40 could indicate to process control 150 the impending passage of a cutout 72a, the next falling edge of the reflective light signal being then taken as the leading edge of the cutout 72a. Also, the relative longitudinal position between each transducer 160 and the corresponding cutting head 64 should be zero or a known distance spaced longitudinally to allow process control 150 to anticipate the upcoming passage of a cutout 72a based on a pattern of reflected light signal activity. In this manner, false conclusions as to the presence of a cutout 72a adjacent a cutting head 64 would be avoided.

In overall operation, the workers fill the trays 40 with fish in appropriate positioning, i.e., with the adipose fin positioned in front of cutout 72a, and allow the cutting heads 64 to precisely cut the adipose fin from the fish. As may be appreciated, prior to running a batch of fish through system 10, the cutting head 64 and trays 40 would be precisely positioned according to the size of the batch to sever precisely the adipose fin as positioned relative to the cutout 72a. So long as the operators can fill all trays, it is contemplated that as many as 14,400 fish per hour can be processed. Thus, in the illustrated embodiment, one person would be responsible for anesthetizing fish, one person would be responsible for delivering anesthetized fish to the marking system, and six persons would be required to fill the trays 40 with anesthetized fish. The marked fish would then be automatically returned to holding tank 27, e.g., by way of slide 26, following discharge from system 10.

Under prior manual cutting methods, one person is required to anesthetized the fish, a second person is required to deliver anesthetized fish to a cutting room, and a much larger work force of persons are required to manually sever the fins from the fish. The manually marked fish are then returned to holding tank 27. Thus, while six persons may be employed to manage the marking operation under the present invention, and achieve a huge volume of throughput, conventional manual cutting methods require a much larger work force devoted to the marking, i.e., manual fin cutting, step. In particular, for the severing of the adipose fin, the average worker employing prior manual cutting methods can cut up to 800 fins per hour. This depends, however, on the ability of the worker to maintain such level of productivity, and it is likely that the average could be somewhat less. According to a rough estimate, this translates into a cost of approximately 2½ cents per fish to mark according to manual methods. In contrast, it is estimated that marking according to the present invention can be accomplished for as little as 0.0083 cents per fish due to the huge increase in productivity provided by the present invention. Thus, even taking into account the cost of the processing machinery, i.e., system 10, required under the present invention, significant savings in costs associated with fish marking can be achieved under the present invention.

The present invention is considered less harmful to the fish due to the reduced time under anesthesia, handling, and stress to the fish generally occurring relative to prior manual marking procedures. In particular, the use of a water jet as a cutting mechanism is considered superior to the relatively more jagged cut provided by scissors under manual methods. Less handling of fish means less deterioration of the protective coating on the fish. As may be appreciated, manual cutting of the fins requires extensive handling and likely trauma or death to the fish. Thus, reduced handling amounts to reduced risk of infection. Also, the use of water as a cutting medium is considered preferable over the use of metal as a cutting medium as under manual methods. The water cutting medium is more natural to the fish and less likely to cause trauma to the fish in association with the marking procedures.

Thus, an improved method and apparatus for the marking of fish has been shown and described. The present invention makes possible high speed mass marking of fish, taking into account the safety of the fish and high productivity levels. It is likely that marking of fish in this manner will reduce the amount of stress, handling, and body damage occurring relative to that of prior manual fin cutting methods. By eliminating or reducing such stress and handling, fish mortality rates can be greatly reduced. Because the machine under the present invention can operate at high speed, the fish need not be anesthetized for as long a period of time relative to that under manual methods. The handling of the fish is generally limited to that of transferring from a holding bin into the trays 40. Once the fish are positioned in the trays 40, they need not be again handled. The cutting of the fin by use of water is considered to be a preferred cutting method also because of the speed and precision provided by such cutting devices.

While the present invention has been shown as a marking mechanism relative to a specific fish fin and a specific cutting media, i.e., the adipose fin cut by use of a water jet stream, it will be understood that a variety of other marking methods, i.e., other fins cut, and other cutting media, e.g., laser, may be employed under the present invention.

It will be appreciated that the present invention is not restricted to the particular embodiment that has been described and illustrated, and that variations may be made therein without departing from the scope of the invention as found in the appended claims and equivalents thereof. For example, loading of system 10 with fish may include a separate conveyor system wherein several people operate out of the same tank of anesthetized fish and feed fish by way of some system, e.g., delivery tubes, into the trays 40. This further reduces the amount of handling required and gets the workers away from the machinery involved as a safety feature for the workers. Knee operated micro-switches may be positioned along the full length of the system so any worker may engage the switch and shut down the conveyor system completely. It is contemplated that the trays 40 be made of stainless steel and welded together. However, the trays could be made of plastic material to aid in manufacturing costs and capabilities. Such plastic tray assemblies should, however, be protected against inadvertent cutting by the cutting mechanism. In particular, the cutting mechanism must be precise enough to avoid cutting of plastic trays. In other words, the timing of the water jet stream activation and deactivation must be carefully timed with respect to the passage of the cutout thereby to avoid cutting of a plastic fish holding tray. By using metal for trays 40, however, there is little risk of tray destruction or damage associated with potential mistiming of the cutting mechanism and thereby provides a more durable and less vulnerable tray 40. Finally, it may be desirable to provide an air flow in the vicinity of each cutout 72a to better orient the fin to be severed relative to the cutting mechanism.

What is claimed is:

1. A method of marking a live fish by severing of a selected fin thereof, the method comprising the steps:
   providing a fish retention tray maintaining the live fish in a given stable position relative to the tray;
   providing a cutting mechanism positioned relative to the tray;
   severing said selected fin by relative movement between the cutting mechanism and the tray while maintaining alive said live fish; and
   providing a control means for activating the cutting mechanism in coordination with said relative movement between the tray and the cutting mechanism.

2. The method according to claim 1 wherein the cutting mechanism is a water jet stream.

3. The method according to claim 1 wherein the tray moves relative to stationary cutting mechanism.

4. The method according to claim 1 wherein the tray is an inclined trough maintaining the fish in a given position upon the tray.

5. The method according to claim 1 wherein the cutting mechanism is a water jet stream and the tray includes a cutout portion allowing passage of a water jet stream therethrough during cutting of said selected fin.

6. An apparatus for marking of live fish by severing a selected fin thereof, the apparatus comprising:
- a plurality of fish holding trays, each tray receiving a live fish and maintaining the live fish in stable position relative to the tray in which it rests whereby the fin to be severed is maintained in a given location relative to the tray in which the live fish rests;
- a marking station including at least one cutting device positioned relative to said plurality of fish holding trays to sever the selected fin of each live fish in each tray upon relative movement of each tray and the cutting mechanism;
- a conveyor providing relative movement between said plurality of fish holding trays and said cutting mechanism; and
- a control means for operating said cutting mechanism in coordination with passage thereby of each fish holding tray to sever the selected fin while maintaining alive said live fish.

7. An apparatus according to claim 6 wherein said cutting mechanism is stationary and each of said plurality of fish holding trays moves relative to said cutting mechanism.

8. An apparatus according to claim 6 wherein said conveyor comprises:
- a support frame carrying said marking station;
- a motor;
- at least one endless conveyor element supported by said frame and coupled to said motor to move in a path including a fish loading area whereat fish are positioned in said fish holding trays, said at least one endless conveyor element carrying said plurality of fish holding trays.

9. An apparatus according to claim 6 wherein at least one of said fish holding trays includes an inclined trough including a nose receiving element at a lower end of said inclined trough whereby a fish placed in said trough comes to rest with its nose against said nose receiving element.

10. An apparatus according to claim 8 wherein said trough comprises a V-shaped trough.

11. An apparatus according to claim 6 wherein at least one of said fish holding trays is adjustable in length to accommodate fish of different size.

12. An apparatus according to claim 6 wherein said cutting device is a water jet stream cutting device.

13. An apparatus according to claim 6 wherein each of said plurality of fish holding trays moves in series past said cutting device and said cutting device reacts to passage of each fish holding tray to severe the fin to be severed.

14. An apparatus according to claim 6 wherein said cutting device is adjustable in position and orientation in at least two dimensions to provide adjustment in relative positioning of said cutting device and said plurality of fish holding trays.

15. An apparatus according to claim 6 wherein said control reacts to passage of said cutting trays therepast by activation of said cutting device.

16. An apparatus for marking a plurality of live fish by severing from each a selected fin, the apparatus comprising:
- a plurality of fish holding trays, each receiving a live fish to be marked and maintaining the live fish in given position relative to the tray in which it rests, the selected fin being thereby maintained in a given position relative to the tray in which it rests;
- a marking station including a cutting device positioned relative to said live fish holding trays to saver said selected fin of each fish;
- a conveyor system carrying said fish holding trays through a tray loading area whereat live fish may be placed in said trays, said conveyor system carrying said trays through said marking station; and
- a control means for coordinating movement of said fish holding trays with operation of said cutting device to sever said selected fins upon passage thereby while maintaining alive said live fish.

17. An apparatus according to claim 16 wherein said cutting device is a water jet stream and said fish holding trays include a cutout allowing free passage of a water jet stream during severing of said selected fin.

18. An apparatus according to claim 16 wherein said fish holding trays include an inclined trough with a nose receiving element at a lower end of the trough whereby a nose of a fish placed in the inclined trough may come to rest against said nose receiving element and remain in stable position relative to the fish holding tray in which it rests.

19. An apparatus according to claim 16 wherein at least a subset of said plurality of fish holding trays moves serially past said cutting device.

* * * * *